United States Patent [19]

Maeder et al.

[11] 4,021,015
[45] May 3, 1977

[54] MOTOR-EQUIPPED CONTROL DEVICE FOR A VALVE ADJUSTING ROD

[75] Inventors: Claude Maeder, Nancy; Jean Georges Sutter, Villers Les Nancy, both of France

[73] Assignee: Pont-A-Mousson S.A., Nancy, France

[22] Filed: July 2, 1975

[21] Appl. No.: 592,691

[30] Foreign Application Priority Data

July 5, 1974 France .............................. 74.23744

[52] U.S. Cl. ............................... 251/133; 310/162
[51] Int. Cl.² ......................................... F16K 31/04
[58] Field of Search .......... 251/133, 134, 135, 136, 251/130; 310/162, 163

[56] References Cited

UNITED STATES PATENTS

| | | | |
|---|---|---|---|
| 2,589,999 | 3/1952 | Feiertag | 310/156 |
| 2,992,807 | 7/1961 | Karlby et al. | 251/134 X |

Primary Examiner—Arnold Rosenthal
Attorney, Agent, or Firm—Sughrue, Rothwell, Mion, Zinn & Macpeak

[57] ABSTRACT

A control device for a valve adjusting rod comprising an electric motor having a variable reluctance, the stator of which is attached to the frame of the valve and the rotor of which is connected for rotation with the adjusting rod - coaxially with respect to the latter.

The rotor and the adjusting rod are co-rotated by means of a key arrangement which provides for an angular play between the rotor and the rod equal to the angular pitch P of the denticulations of the rotor.

Repetition thereof with a nominal couple of the motor makes it possible to increase the locking or unlocking couple of the valve.

9 Claims, 7 Drawing Figures

U.S. Patent    May 3, 1977    4,021,015
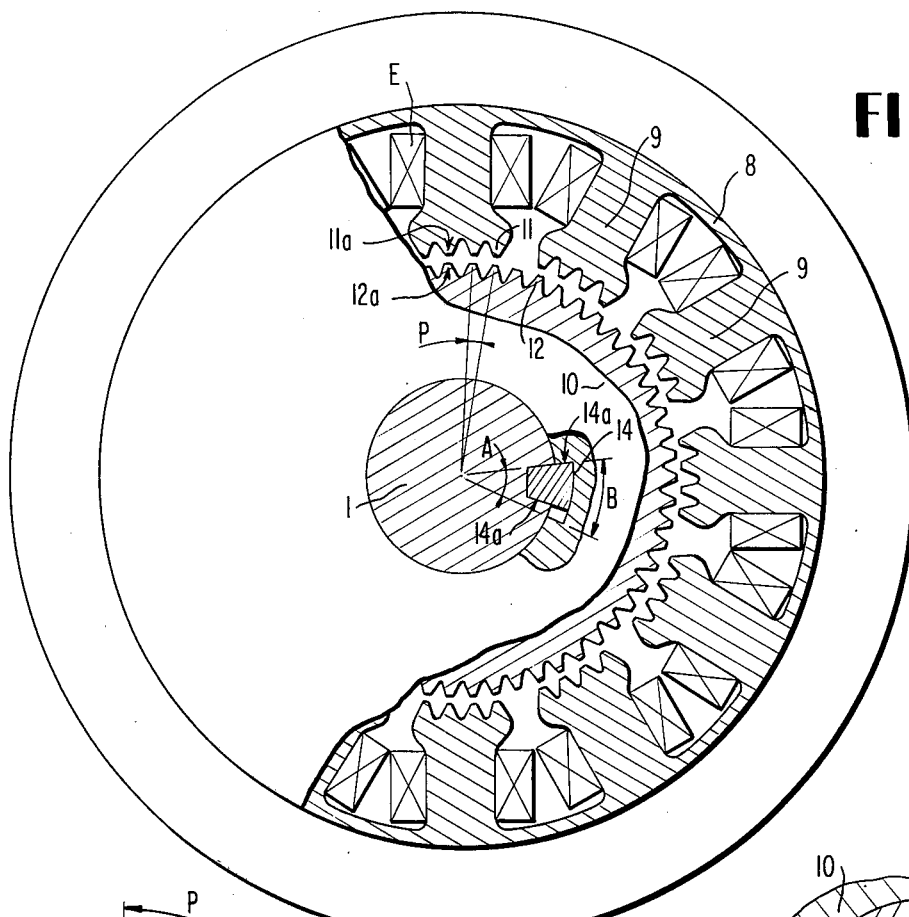
FIG.1
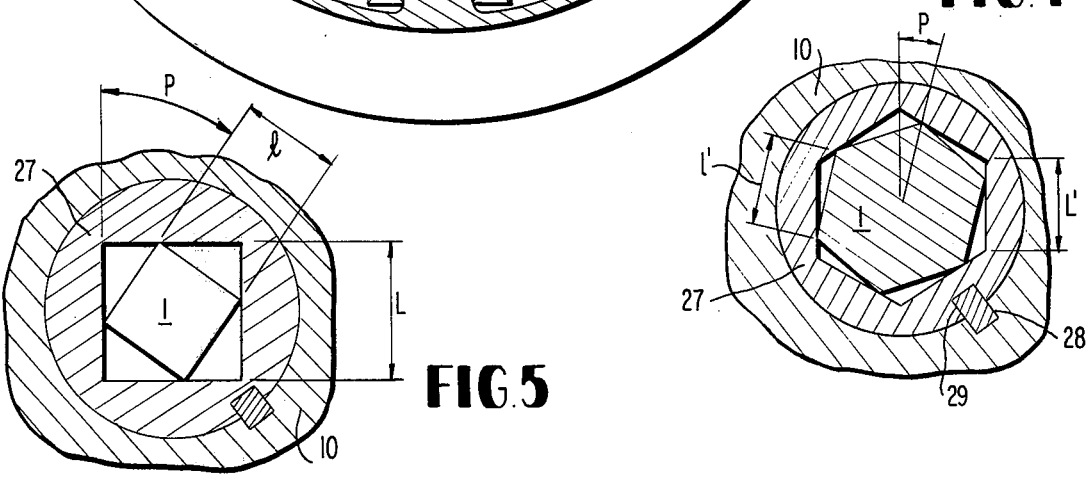
FIG.4
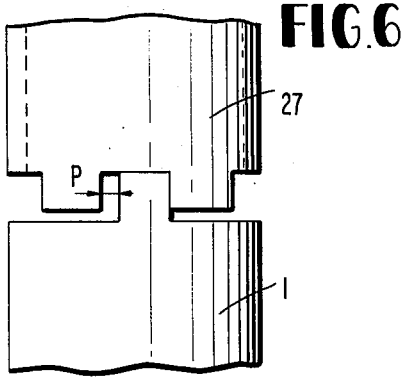
FIG.5
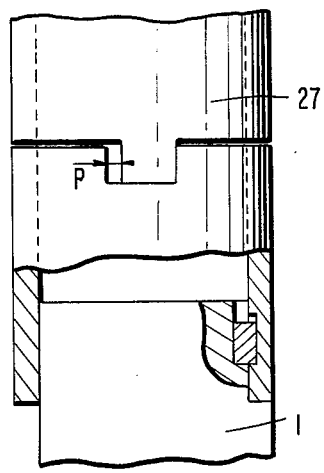
FIG.6
FIG.7

MOTOR-EQUIPPED CONTROL DEVICE FOR A VALVE ADJUSTING ROD

BACKGROUND OF THE INVENTION

1. Field of the Invention

This invention relates to a control device for a valve adjusting rod comprising an electric motor having a variable reluctance, the stator which is attached to the frame of the valve and the rotor of which is keyed for rotation with the adjusting rod- coaxially with respect to the latter.

2. Description of the Prior Art

In U.S. Patent application Ser. No. 370,261 now U.S. Pat. No. 3,946,984, to Sutter assigned to Pont-A-Mousson S.A. there is provided a slight annular play in the mechanical connection between the adjusting rod and the rotor of the motor. However, in this embodiment the amount of the slight play is not indicated. It is produced between abutment bosses situated on a part which is keyed for rotation with the rotor and on a part which is keyed for rotation with the adjusting rod.

SUMMARY OF THE INVENTION

Accordingly, the object of the present invention is firstly, to determine the amount of play which is required for more efficient operation of the control device and, secondly, to propose other embodiments.

To this end, according to the present invention, a control device for a value adjusting rod having an electric motor, in the form of a variable reluctance motor, the stator of which is attached to the frame of the valve and the rotor of which is keyed for rotation with the adjusting rod (coaxially with respect to the latter) and which is externally provided with radial denticulations uniformly distributed on its circumference, is characterized in that it comprises a device for co-rotating the rotor with the adjusting rod with angular play between the rotor and the rod which is at least equal to the angular pitch of the denticulations of the rotor.

By virtue of this angular play, and of the special feature of variable reluctance motors in attaining their synchronous speed over an angle of rotation which corresponds generally to the angular pitch of the denticulations of the rotor, the motor can thus attain its speed of synchronism and its nominal couple through this play and can thus produce a repeated jolting action on the adjusting rod when the latter is locked in place such that it is locked or unlocked with a nominal couple of the motor.

Other objects, features and advantages of the present invention will be made apparent from the following detailed description thereof which is provided with reference to the accompanying drawings.

BRIEF DESCRIPTION OF THE DRAWINGS

FIG. 1 is a diagrammatical, partial sectional view of a control device according to the invention.

FIG. 4 is a partial sectional view of second variant.

FIG. 5 is a partial sectional view of a third embodiment of the mating system according to the present invention.

FIG. 6 is a partial side view of a fourth embodiment according to the present invention.

FIG. 7 is a partial side view, partially broken away, showing a fifth embodiment of the mating system according to the present invention.

DETAILED DESCRIPTION OF THE PREFERRED EMBODIMENTS

Figure 2:
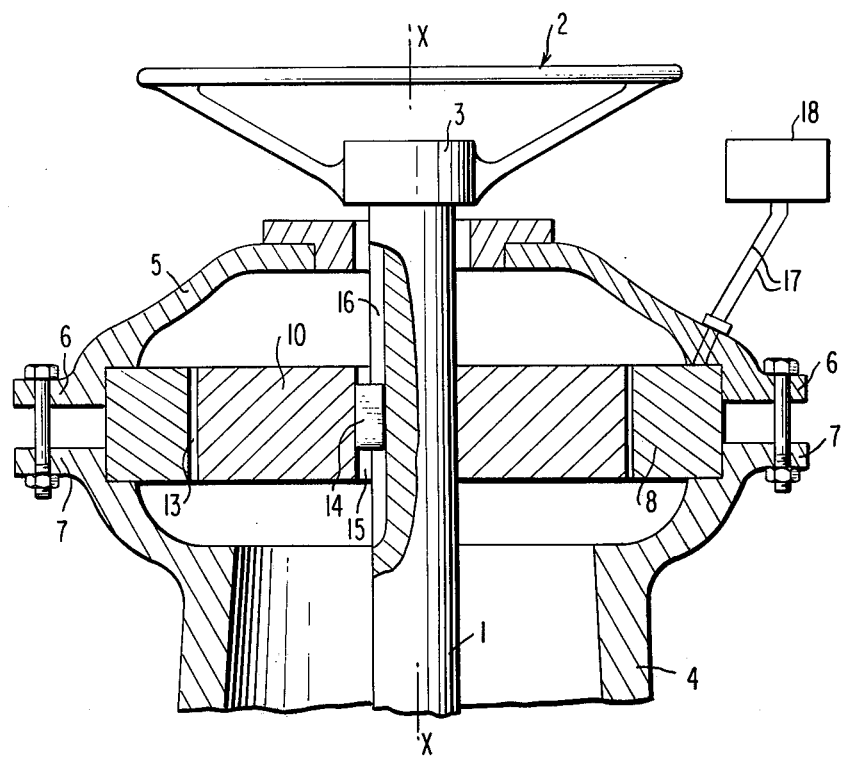
FIG. 2 is a diametrical sectional view of this device.

In the embodiment represented in FIGS. 1 and 2, the invention is applied to the control of an adjusting rod 1 having the axis X—X of a valve. This adjusting rod is provided on its opposite end to the closing device (not shown) with a manipulating wheel 2 which comprises a hub 3 and which is keyed on the adjusting rod. This rod 1 is disposed inside a cast housing 4 which is secured to the body of the valve per se by means of flanges and bolts. The housing 4 is closed by a cap 5 through which passes the adjusting rod 1 in the region of the manipulating wheel. This housing 4 and the cap 5 grip between their flanges 6 and 7 the stator 8 which comprises twelve poles 9, of an electric motor with a variable reluctance (the poles 9 bear windings E). A crown-shaped rotor 10 is disposed inside the stator 8. The stator 8 and the rotor 10 are provided with radial denticulations 11–12 extending internally and externally, respectively, and being regularly distributed on the circumference. The angular pitch of the denticulations of the rotor corresponds to the angular distance between two consecutive denticulations of the rotor. The tips 11a and 12a of the denticulations of the stator and rotor have between them a small clearance 13 which is very narrow by comparison with the dimensions of the rotor 10.

The rotor 10 having the axis X—X is coaxial and is mated with the rod 1 by means of a mating arrangement. This mating arrangement consists of a key 14 which engages in an axial groove 15 inside the rotor 10 and inside an axial groove 16 of the adjusting rod 1.

The key 14 has a trapezoidal section, the non-parallel sides 14a of which are radially directed and form an angle A between one another. The axial grooves of the shaft 1 and of the rotor 12 also have a trapezoidal section with radial sides — those of the rod 1 forming between one another an angle A and those of the groove of the rotor 10 forming between one another an angle B which corresponds to the angle A plus the angular pitch P of the denticulations of the rotor.

The device which has been described operates in the following manner:

When the windings E provided on the stator are supplied with current through conductor wires 17 connected to a current source 18, the rotor is exposed to the action of a magnetic field and it drives the adjusting rod 1 in rotation through the intermediary of the key 14 disposed in the grooves 15 and 16, respectively, of the rotor 10 and the rod 1. This rotation ceases as soon as the electric current supply is interrupted. The presence of denticulations 11 on the internal periphery of the stator 8 and of denticulations 12 on the external periphery of the rotor 10 enables the motor to turn with the so-called "vernier effect." In other words the adjusting rod 1 can be rotated at low speed with similar precision to that of a vernier scale. In fact, in the case of a variable reluctance motor of this type which is supplied with three-phase electric current by way of diodes, the rotor 10 rotates at synchronous speed as a function of the number of denticulations of the rotor and thus of the angular pitch P.

In addition, a motor of this type has the property of attaining its synchronous speed over an angle of rotation which corresponds to the angular pitch P of the denticulations of the rotor. Thus, by virtue of the presence of a coupling play between the key 14 and the groove 15 of the rotor 10 which corresponds to the angular pitch P, when the rod is in its blocked position, the motor can attain its nominal couple in the course of its rotation during the period when it is rotating at an angle corresponding to the play P. During this displacement with an angular pitch P, the energy obtained is converted into rotational displacement of the adjusting rod under the action of the jolt which is produced. The presence of this play which corresponds to the angular pitch P makes it possible for this jolt to be repeated with a normal couple, thereby increasing the stress exerted by the motor on the adjusting rod 1 such that it is possible to obtain a closing or opening couple of the valve controlled by the adjusting rod, which is greater than the nominal couple of the motor.

The results of experiments have shown that it is thus possible to obtain a closing or opening couple 2 − 2.5 times greater than the nominal couple of the motor. This is due to the use of the repeated jolting effect provided by the presence of a coupling play which corresponds to the angular pitch P of the denticulations of the rotor.

In the embodiment described above the play between the key 14 and the groove 15 is equal to the angular pitch P but this play can also be greater than the pitch P.

Figure 3:
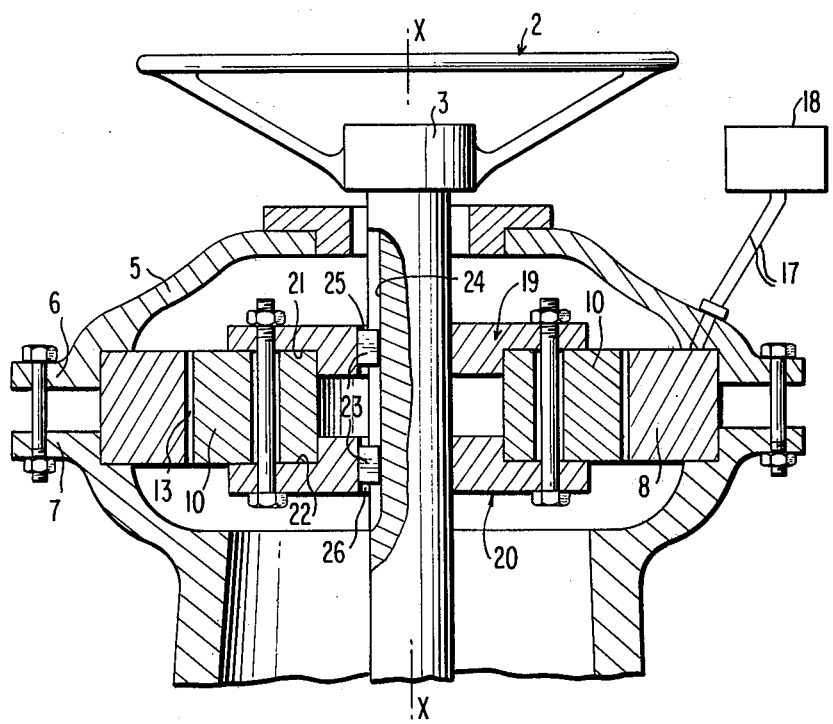
FIG. 3 is a similar view of a first variant of this device.

In the embodiment represented in FIG. 3 the rotor 10 is keyed for rotation with the adjusting rod 1 by means of two annular steel support plates or rotor supports consisting of an upper support 19 and a lower support 20 which comprise oppositely disposed shoulders 21 and 22 designed to rest on the rotor. The two supports are both threaded and are connected to the rod 1 by means of keys 23 which engage in a groove 24 of the rod and in grooves 25 and 26 formed in the plates 19 and 20, respectively. The keys 23 and the grooves 24, 25 and 26 correspond respectively to the key 14 and the grooves 16 and 15 of the embodiment described above and represented in FIG. 1.

A variant of the invention consists in that the angular dimension of the groove 14 of the rod 1 corresponds to the angle B and in that the anglular dimensions of the groove 16 and the key 15 correspond to the angle A (or correspond to the angle B minus the angular pitch P and of the denticulations of the rotor).

Another variant of the invention consists in that the rod 1 is keyed for rotation with the rotor 10 with angular play through the intermediary of a coaxial hollow shaft 27 enclosing the rod 1. This hollow shaft is keyed for rotation without angular play by way of any type of coupling means such as a key 28 engaging in an axial groove 29 of this hollow shaft 27.

The hollow shaft 27 can be keyed for rotation with the rod 1 with an angular play which is at least equal to the angular pitch P in a number of different ways.

If the internal surface of the hollow shaft is cylindrical, this hollow shaft 27 can be keyed for rotation with the rod 1 in a similar manner to that which was arranged between the rotor 10 and the rod 1 in the embodiment which was described above and represented in FIG. 1.

If the internal surface of the hollow shaft has a square section with sides L, the rod 1 also has an external surface with a square section, the side of which is less than L/(cos P + sin P) but greater than L/$\sqrt{2}$. The side can also be equal to L/(cos P + sin P) when it is wished to obtain a play equal to the angular pitch P.

If the internal surface of the hollow shaft has a hexagonal section with sides L', the rod 1 also has an external surface having a hexagonal section with sides l' which are less than $$L' \left( \frac{\sin P}{\sqrt{3}} + \cos P \right)$$

but greater than $$L \frac{\sqrt{3}}{2}.$$

In this variant a hollow sleeve designed to rotate with the rod 1 may be mounted on top of the rod 1. The angular play between the sleeve and the hollow shaft 27 can be obtained by any of the methods described above.

Alternatively, as shown in the embodiment of FIG. 6, the rod and the shaft of the motor may be provided with integral axial denticulations or keys which have an angular play equal to the angular pitch P.

Another variant of the invention shown in FIG. 7 consists in wedging between the rod and the shaft of a motor a sleeve which is keyed for rotation with the adjusting rod and which comprises axial denticulations or keys designed to cooperate with the paired axial denticulations or keys on the shaft of the motor. An angular play which is equal to the angular pitch P of the denticulations of the rotor is provided between the paired denticulations of the sleeve and the shaft.

What is claimed is:

1. In a valve adjusting mechanism haing an electric motor with variable reluctance, said motor having a stator attached to a frame of the valve and a rotor disposed concentrically within said stator, said rotor and stator being provided with denticulations having a predetermined angular pitch, and an adjusting rod connected to a valve, the improvement comprising a mating system means connecting the rotor to the adjusting rod to cause said adjusting rod to rotate with said rotor while allowing angular play between the rotor and the adjusting rod at least equal to the angular pitch of the denticulations of the rotor and stator.

2. A device as claimed in claim 1, characterized in that the mating system consists of a keying arrangement comprising a key 14 engaging in two grooves: one of the grooves and the key each comprising trapezoidal sections, the non-parallel sides of which form an angle which is smaller by at least an angular pitch P than the angle formed by the non-parallel sides of the other groove haing a trapezoidal section.

3. A device as claimed in claim 2, characterized in that one of the grooves is situated on the inner surface of the rotor and the other on the adjusting rod.

4. A device as claimed in claim 2, characterized in that one of the grooves is situated on the inner surface of two annular plates integral with the rotor and the other groove is situated on the adjusting rod.

5. A device as claimed in claim 1, characterized in that the mating system consists of a hollow shaft adapted for rotation with the rotor and coaxial to the adjusting rod (1), the internal surface of which has a geometrical section which cooperates with the external surface of the adjusting rod (1).

6. A device as claimed in claim 5, characterized in that the section of the internal surface of the hollow shaft and the section of the external surface of the rod (1) are square and the respective sides $L$ and $l$ thereof are such that $L$ is smaller than $L/(\cos p + \sin p)$ and greater than $L \sqrt{2}$ and is the angular pitch of the denticulations of the rotor.

7. A device as claimed in claim 5, characterized in that the section of the internal surface of the hollow shaft and the section of the external surface of the rod (1) are hexagonal and their respective sides $L'$ and $l'$ are such that $l'$ is smaller than $$L \left( 1 \frac{\sin p}{\sqrt{5}} + \cos p \right)$$

and greater than $$L \frac{\sqrt{3}}{2}.$$

and constitutes the angular pitch of the denticulations of the rotor.

8. A device as claimed in claim 1, characterized in that the mating arrangement is a rotary drive system wherein the adjusting rod is provided with integral axial denticulations which cooperate with integral axial denticulations provided on the rotor; angular play being provided between the denticulations.

9. A device claimed in claim 1, characterized in that the mating arrangement is provided between the rotor and an extension of the adjusting rod; said extension being designed for rotation with the adjusting rod.

* * * * *